United States Patent [19]

Tsuyama et al.

[11] Patent Number: 4,933,859
[45] Date of Patent: Jun. 12, 1990

[54] CONSTANT-SPEED CRUISING CONTROL SYSTEM

[75] Inventors: Toshiaki Tsuyama; Kazutoshi Nobumoto; Kaoru Sotoyama; Toshihiro Matsuoka; Eizi Nishimura, all of Hiroshima, Japan

[73] Assignee: Mazda Motor Corporation, Hiroshima, Japan

[21] Appl. No.: 263,416

[22] Filed: Oct. 27, 1988

[30] Foreign Application Priority Data

Oct. 27, 1987 [JP] Japan .................. 62-270853

[51] Int. Cl.$^5$ .............................. B60K 31/00
[52] U.S. Cl. .............. 364/426.04; 364/424.1; 180/179; 74/866
[58] Field of Search ........... 364/424.1, 426.04; 123/352; 74/866; 180/179

[56] References Cited

U.S. PATENT DOCUMENTS

| | | | |
|---|---|---|---|
| 4,697,478 | 10/1987 | Mastumoto et al. | 74/859 |
| 4,769,774 | 9/1988 | Narita et al. | 364/424.1 |
| 4,789,936 | 12/1988 | Kurihara et al. | 364/424.1 |
| 4,811,224 | 3/1989 | Kuerschner et al. | 364/424.1 |
| 4,829,435 | 5/1989 | Isono | 364/424.1 |
| 4,829,438 | 5/1989 | Etoh | 364/426.04 |
| 4,833,612 | 5/1989 | Okuno et al. | 364/426.04 |
| 4,834,045 | 5/1989 | Imai et al. | 123/352 |
| 4,843,553 | 6/1989 | Ohata | 364/426.04 |

FOREIGN PATENT DOCUMENTS 0142044 5/1985 European Pat. Off. .
0142046 5/1985 European Pat. Off. .
58-192114 9/1983 Japan .

OTHER PUBLICATIONS

Patent Abstracts of Japan, vol. 8, No. 38 (P-255)[1475], 18th Feb. 1984, p. 167, P255 (JP-A-58 192 114).

*Primary Examiner*—Thomas G. Black
*Attorney, Agent, or Firm*—Sixbey, Friedman, Leedom & Ferguson

[57] ABSTRACT

A constant-speed cruising control system for a vehicle having an automatic transmission includes a vehicle speed controller which controls the throttle valve of the engine on the basis of the difference between a target vehicle speed and the actual vehicle speed so that the latter approaches the former, a gear shifting mechanism which receives a gear shifting command and shifts the gear stage of the automatic transmission according to the content of the gear shifting command which it receives, and a gear-shifting controller which receives an engine load signal representing the load on the engine and a speed difference signal representing the difference between said target vehicle speed and the actual vehicle speed, and delivers to the gear shifting mechanism a gear shifting command which requires the gear shifting mechanism to shift the gear stage down either when the load on the engine is not lighter than a first preset value or when the load on the engine is lighter than the first preset value and heavier than a second preset value and at the same time the difference between the target vehicle speed and the actual vehicle speed is larger than a preset speed.

14 Claims, 13 Drawing Sheets

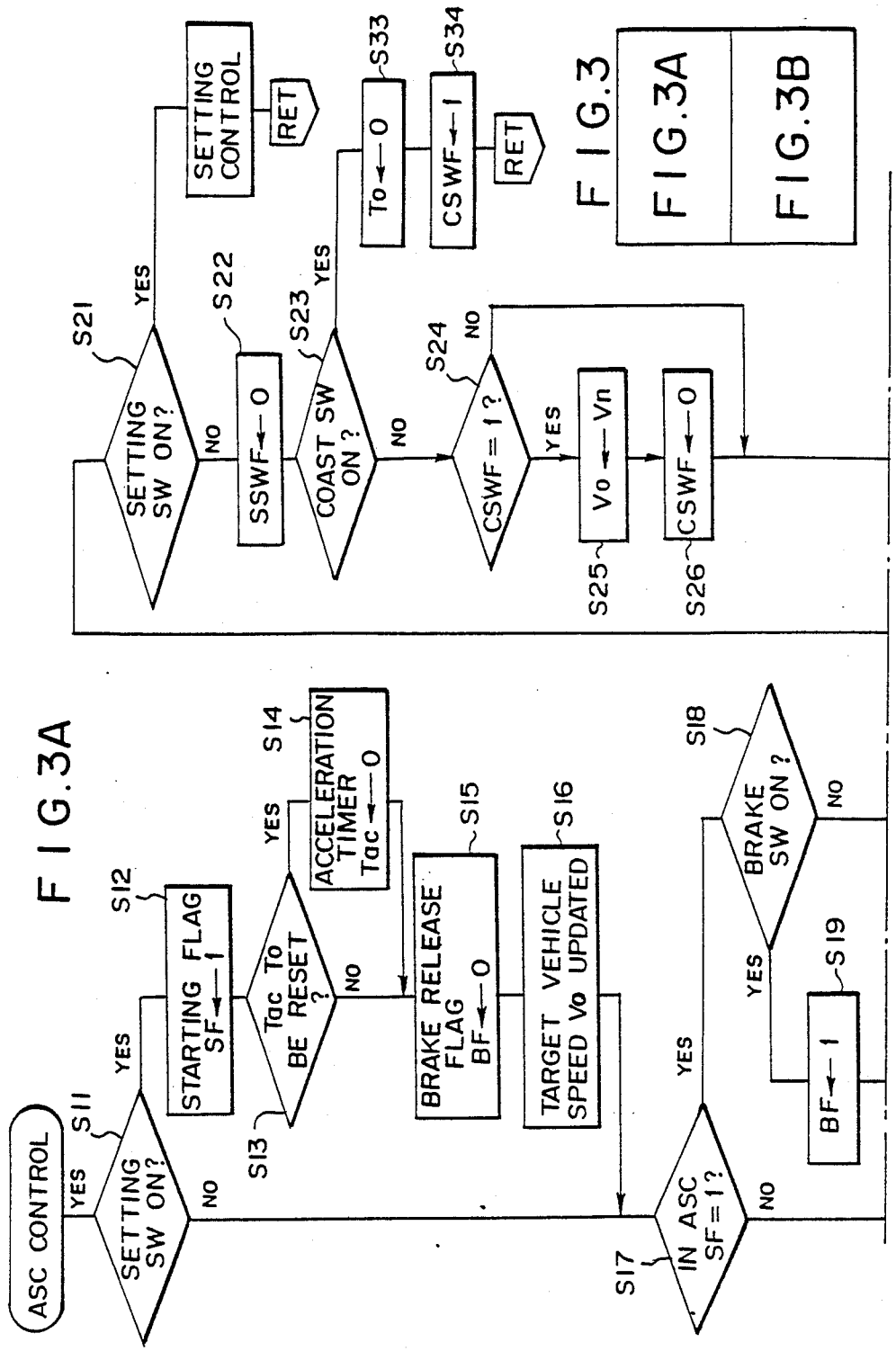

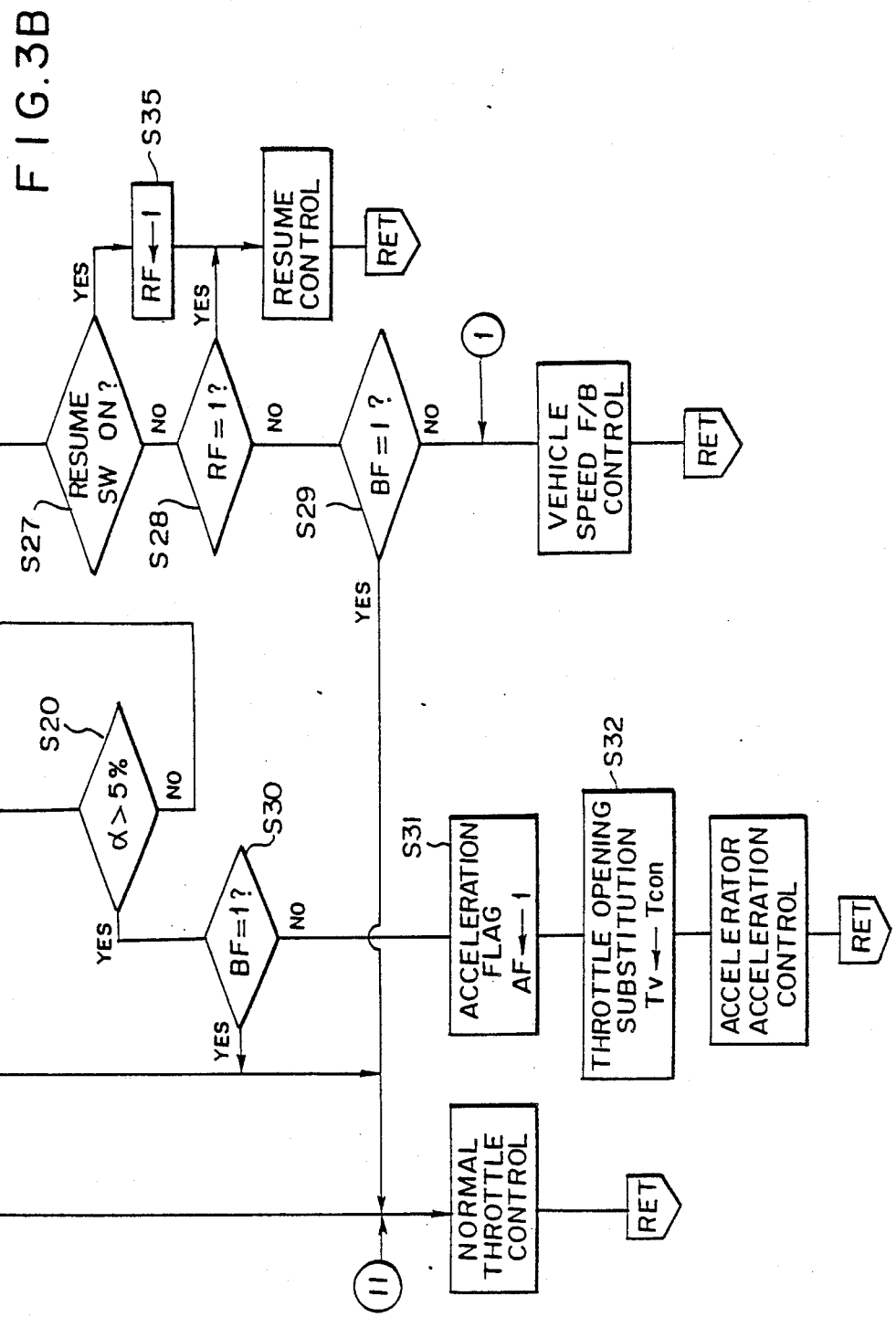

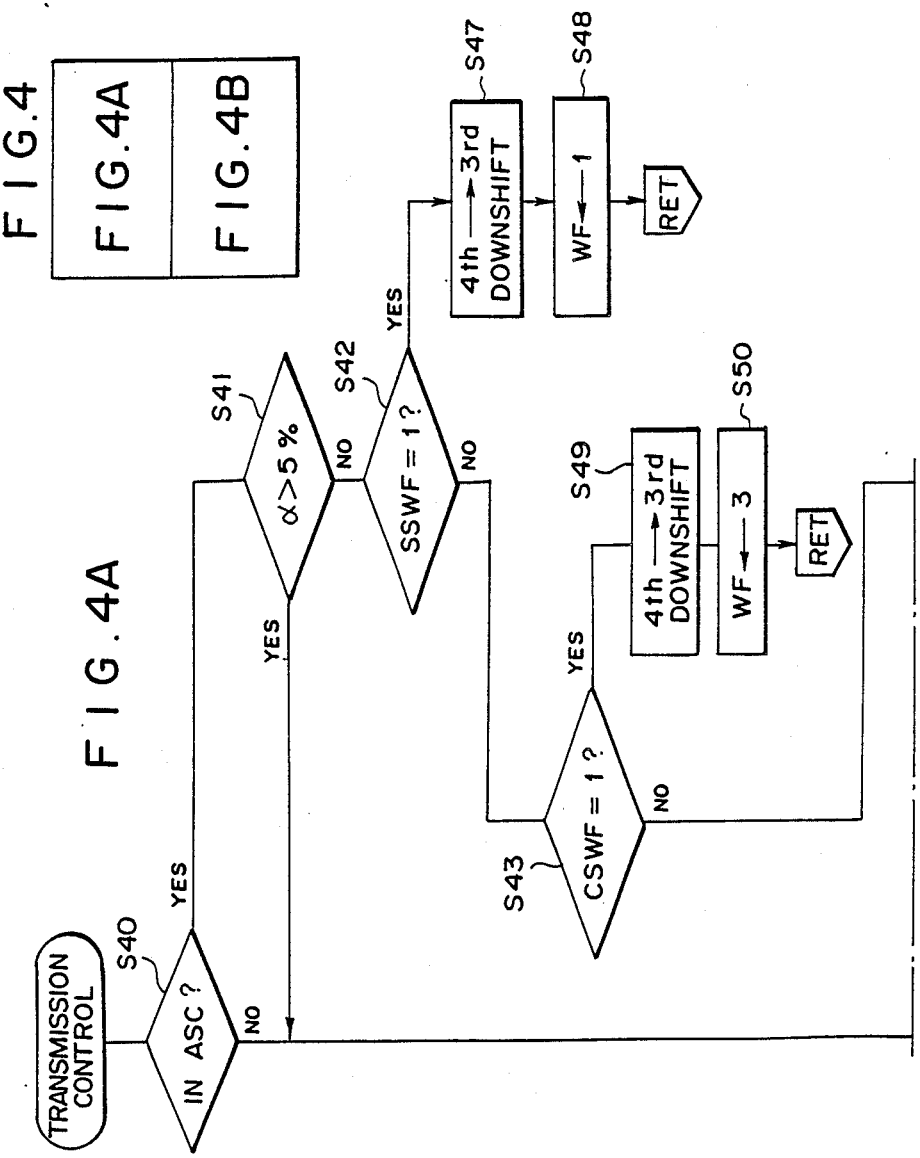

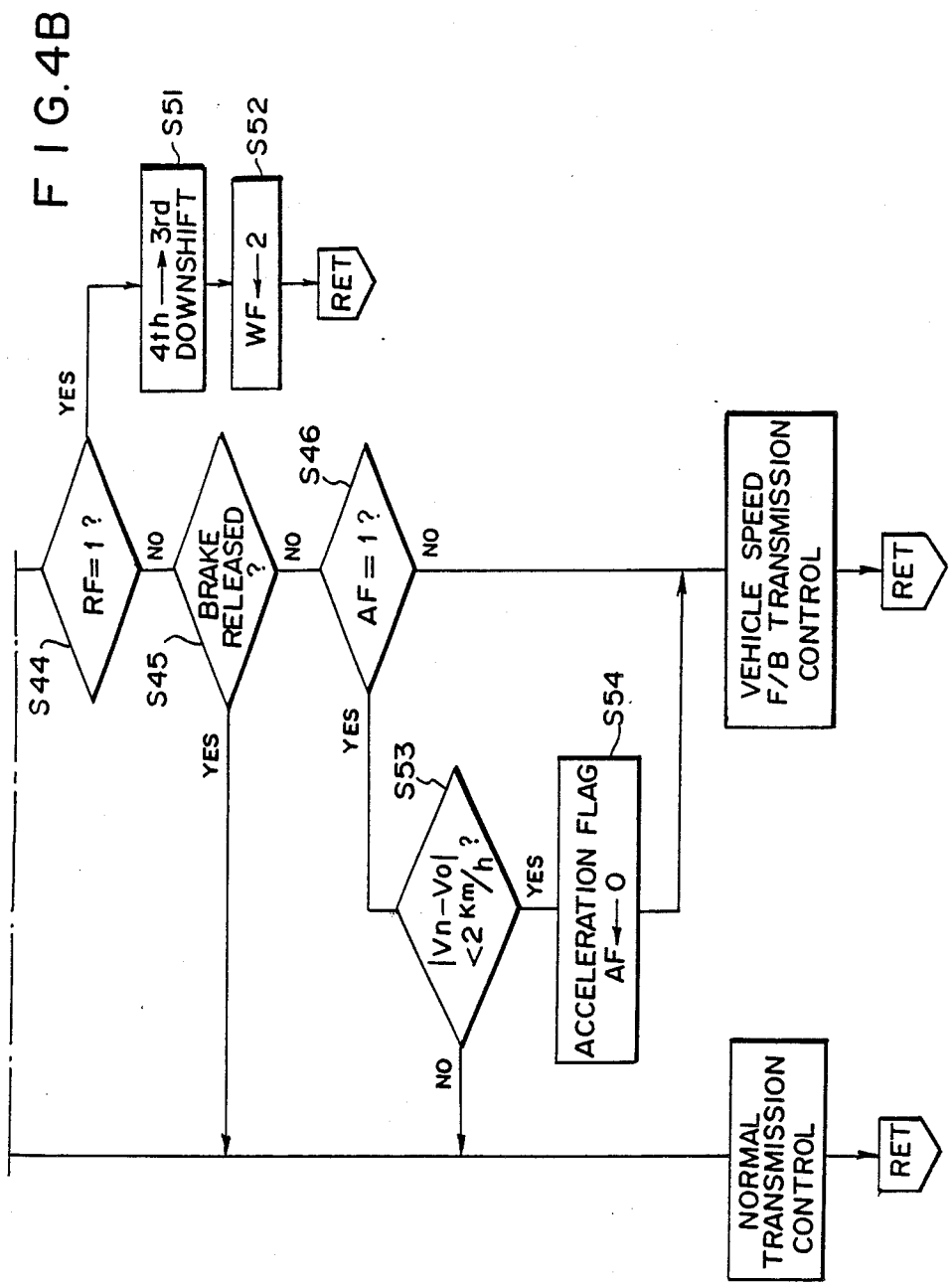

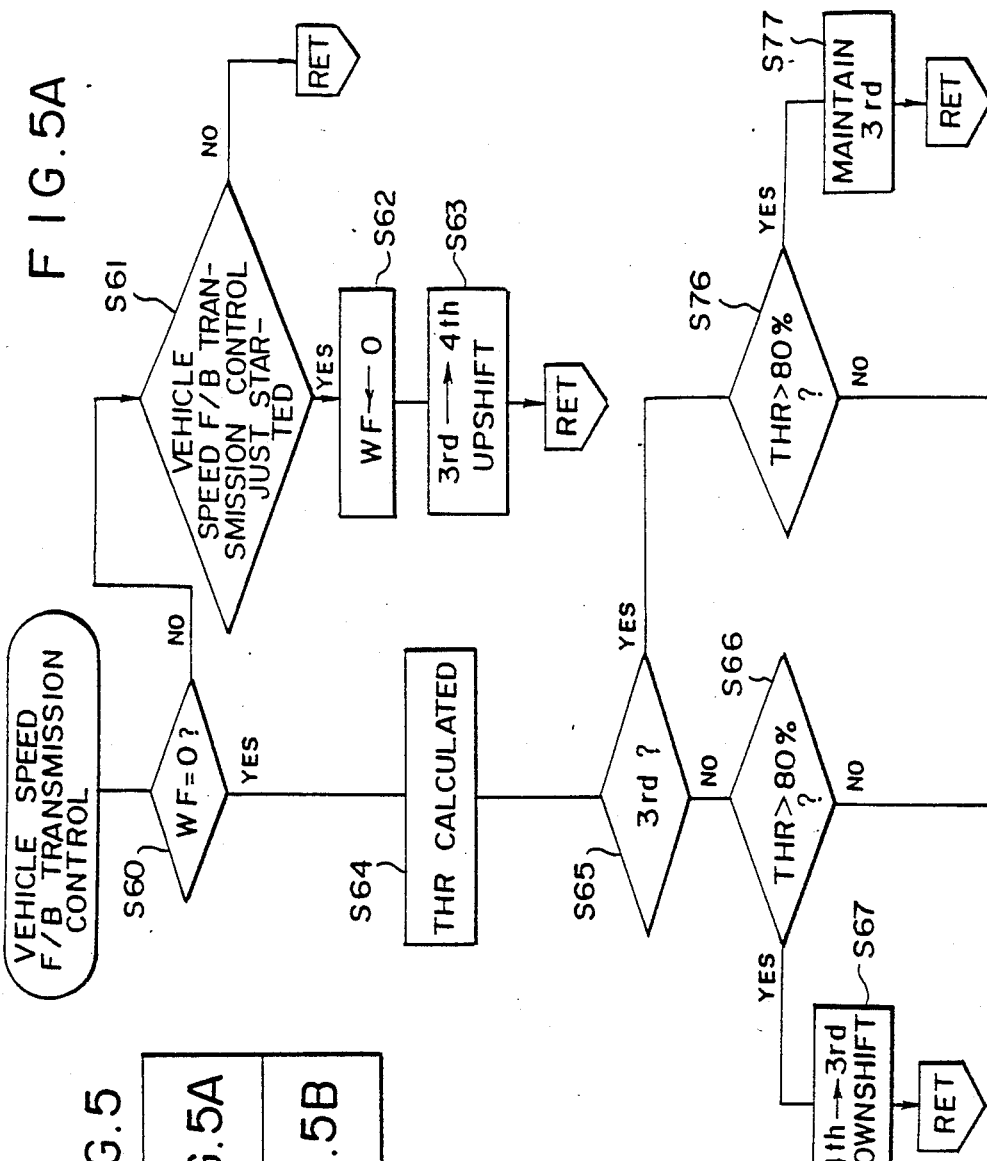

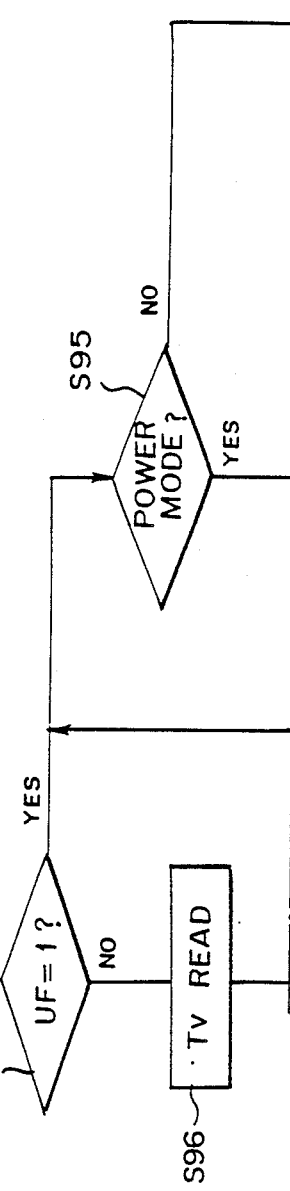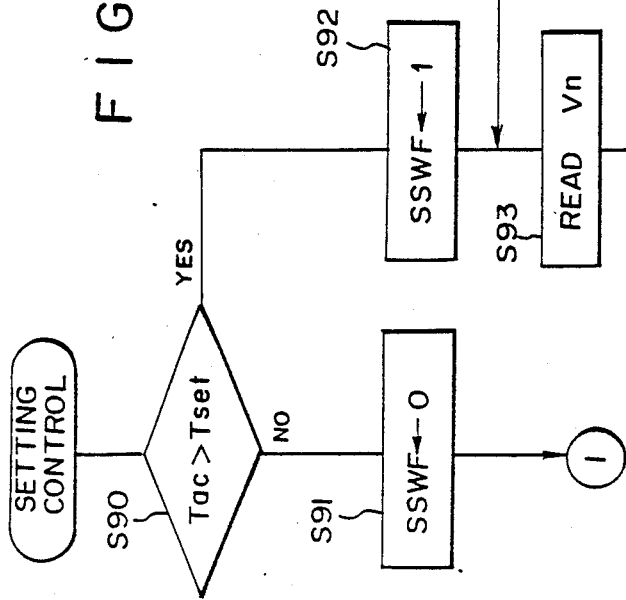

CONSTANT-SPEED CRUISING CONTROL SYSTEM

BACKGROUND OF THE INVENTION

1. Field of the Invention

This invention relates to a constant-speed cruising control system for a vehicle, which makes the vehicle cruise at a desired constant speed.

2. Description of the Prior Art

Constant-speed cruising control systems for making vehicles cruise at a desired constant speed are known in the art. For example, in the system disclosed in Japanese Unexamined Patent Publication No. 58(1983)-192114, the vehicle is made to cruise at a desired constant speed by controlling the throttle opening according to the difference between the actual vehicle speed and the target vehicle speed (the desired speed). When the actual vehicle speed becomes lower than the desired vehicle speed by a predetermined value with the throttle valve fully opened, the automatic transmission is caused to downshift.

This system is disadvantageous in the following way. When the vehicle ascends a slope under the control of the system and the load on the engine increases, the system gradually increases the throttle opening to compensate for the increase in the engine load and causes the transmission to downshift when the throttle opening is maximized. When the actual vehicle speed reaches the target vehicle speed by virtue of the downshift, the system causes the transmission to upshift. Since the throttle opening is almost full at the time the upshift is effected, the upshift leads to a shortage in the engine output torque and a reduction in the vehicle speed. Then the system again causes the transmission to downshift. Thus the vehicle speed fluctuates up and down and hunting of the transmission occurs.

This problem may probably be overcome by taking into account the torque margins in controlling the throttle opening and the transmission. The torque margins can be determined by setting a threshold for the throttle opening. However, if the threshold, or preset value, is determined on the basis of the running resistance during running on an even road, which resistance is relatively small, hunting of the transmission occurs when the running resistance increases as when the vehicle ascends a slope and it becomes hard to converge the actual vehicle speed on the target vehicle speed. On the other hand, if the preset value is determined on the basis of a high running resistance, the transmission is caused to downshift even when the running resistance slightly increases while the vehicle runs on an even road, and fuel economy is deteriorated.

In view of these observations, we have proposed, in our U.S. Pat. application Ser. No. 32,236 now U.S. Pat. No. 4,833,612, to determine the preset value taking into account the conditions under which the vehicle runs, i.e. the running conditions, such as the inclination of the road on which the vehicle is running, road surface resistance or the like. However, this system has a drawback in that means for detecting the running condition is additionally required, which adds to the manufacturing cost of the system.

SUMMARY OF THE INVENTION

In view of the foregoing observations and description, the primary object of the present invention is to provide a constant-speed cruising control system which can satisfactorily control the vehicle speed under any running condition without requiring any additional information which is not essential to the intrinsic function of the system.

The constant-speed cruising control system in accordance with the present invention is for a vehicle having an engine and an automatic transmission having a plurality of gear stages, and is characterized by having a vehicle speed control means which controls an engine output control means on the basis of the difference between a target vehicle speed and the actual vehicle speed so that the latter approaches the former, a gear shifting means which receives a gear shifting command and shifts the gear stage of the automatic transmission according to the content of the gear shifting command which it receives, and a gear-shifting control means which receives an engine load signal representing the load on the engine and a speed difference signal representing the difference between said target vehicle speed and the actual vehicle speed, and delivers to the gear shifting means a gear shifting command which requires the gear shifting means to shift down the gear stage either when the load on the engine is not lighter than a first preset value or when the load on the engine is lighter than the first preset value and heavier than a second preset value and at the same time the difference between the target vehicle speed and the actual vehicle speed is larger than a preset speed.

BRIEF DESCRIPTION OF THE DRAWINGS

FIGS. 3 to 7 are flow charts respectively showing subroutines of the controller.

DESCRIPTION OF THE PREFERRED EMBODIMENTS

Figure 1:
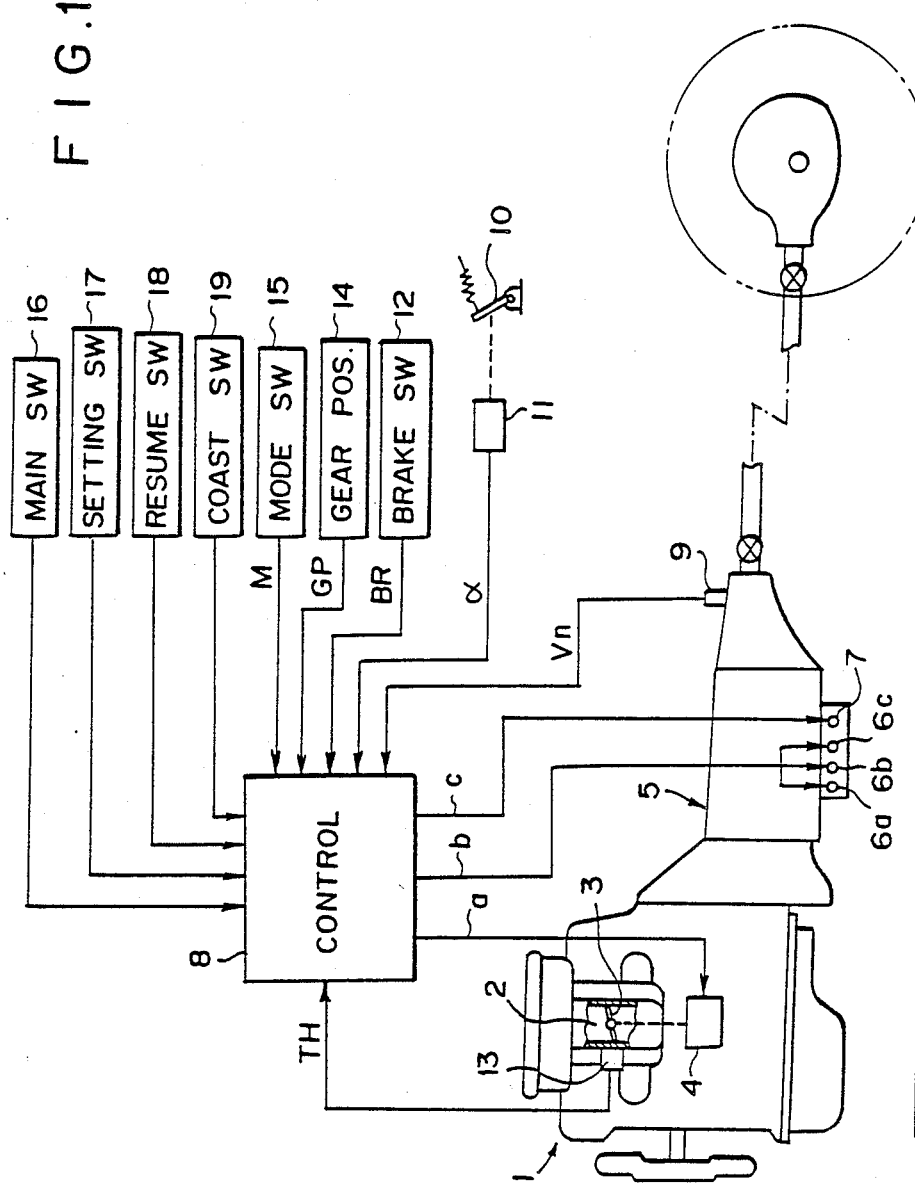
FIG. 1 is a schematic view showing a constant speed cruising system in accordance with an embodiment of the present invention.

In FIG. 1, an engine 1 has an intake passage 2 provided with a throttle valve 3 for controlling the amount of intake air. The throttle valve 3 is opened and closed by a throttle actuator 4 which may comprise a DC motor, for example. An automatic transmission 5 has gear-shifting solenoids 6a to 6c and a lockup solenoid 7, and by selectively energizing the gear-shifting solenoids 6a to 6c, the hydraulic control circuit of the automatic transmission 5 is controlled to selectively apply and release the hydraulic fastening elements of the automatic transmission 5, and the transmission gear mechanism is thereby caused to shift the gear stages. By energizing the lockup solenoid 7, the lockup clutch (not shown) in the torque converter of the automatic transmission 5 is applied and by de-energizing the same, the lockup clutch is released.

A controller 8 outputs a throttle control signal a, a gear-shifting control signal b and a lockup control signal c respectively to the throttle actuator 4, the gear-shifting solenoids 6a to 6c, and the lockup solenoids 7.

To the controller 8 are input a vehicle speed signal Vn from a vehicle speed sensor 9, an accelerator pedal depression signal α from an accelerator position sensor 11 which detects the amount of depression of an accelerator pedal 10, a brake signal BR from a brake switch 12 which detects application of a brake (not shown), a throttle opening signal TH from a throttle position sensor 13 which detects the opening of the throttle valve 3, a gear position signal GP from a gear position sensor 14 which detects which driving range the selector lever of the automatic transmission 5 is in, and a gear-shifting mode signal M from a mode switch 15. Further control signals (an on-off signal) are input into the controller 8 from a main switch 16, a setting switch 17, a resume switch 18, and a coast switch 19, which act as control switches for constant-speed cruising control.

Operation of the controller 8 will be described with reference to the flow chart shown in FIG. 2.

Figure 2:
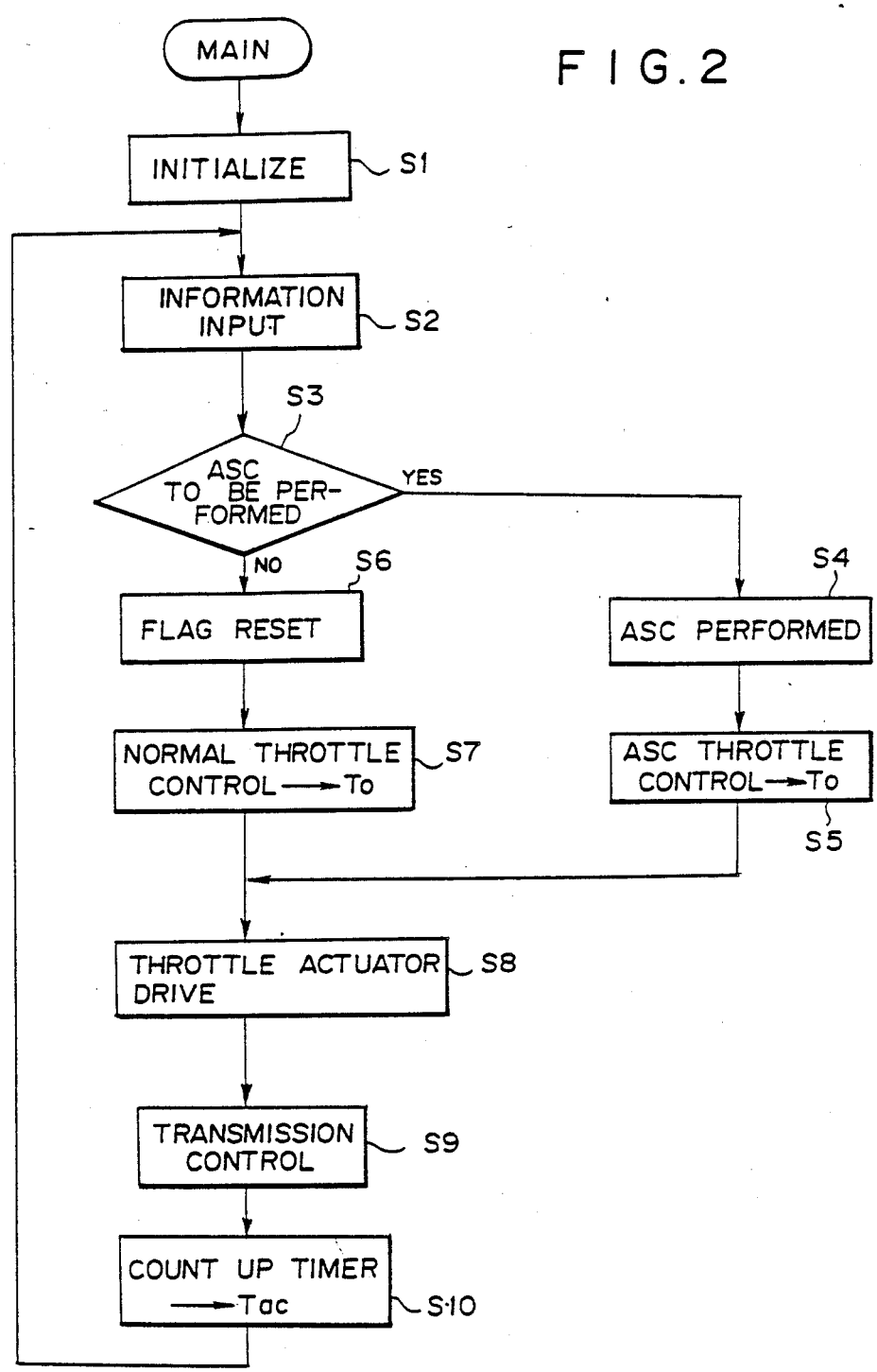
FIG. 2 is a flow chart showing a main routine of the controller.

FIG. 2 shows a main routine of the controller 8. The controller 8 is first initialized in step S1. Then in step S2, detecting signals of the aforesaid sensors are read and various information required for control is obtained. In step S3, whether the requirements for starting automatic speed control (ASC), including constant-speed cruising control, have been satisfied is determined. That is, when the main switch 16 has been closed, the selector lever is in the D-range, and the vehicle speed is higher than a preset value (e.g., 40 Km/h), the controller 8 determines that the ASC may be started. When one of these requirements is not satisfied, or the brake is operated, the ASC is interrupted.

When the ASC requirements have been satisfied, the controller 8 performs mode setting control, that is, the controller 8 selects a vehicle speed feedback control mode, an accelerating mode or the like, according to the operation of the setting switching 17, the resume switch 18, and the coast switch 19, as well as the operation of the accelerator pedal 10 and the brake. Then the controller 8 sets a target throttle opening To on the basis of the mode selected (step S4). On the other hand, when the ASC requirements have not been satisfied (step S5), the controller 8 proceeds to step S6, where various flags for the ASC are reset. Then the controller 8 sets a target throttle opening To according to the amount of depression of the accelerator pedal 10 in step S7 (normal throttle control).

The controller 8 outputs a throttle control signal a corresponding to the target throttle opening To set in step S5 or S7 to the throttle actuator 4, thereby moving the throttle valve 3 to the position corresponding to the target throttle opening To (step S8). Then in step S9, the controller 8 sets the gear stage on the basis of the vehicle speed signal Vn, the accelerator pedal depression signal α, the throttle opening signal TH and the like and outputs the control signals b and c to the solenoids 6a to 6c and 7. Then in step S10, the controller 8 counts, using an acceleration timer Tac, which causes a delay to be described later. The routine shown in FIG. 2 is performed every predetermined time (e.g., 30 msec).

FIG. 3 shows a subroutine for the mode setting control carried out in the step S4 in the main routine. In step S11 of this subroutine, the controller 8 makes a judgement as to whether the setting switch 17 has been closed. When the answer is YES, i.e., when it is judged that the setting switch 17 has been closed, a starting flag SF is set to 1 in step S12. In step S13 the controller determines whether the conditions require reset of the acceleration timer Tac, i.e., whether a target vehicle speed Vo has been set. In the case that the target vehicle speed Vo is to be set by the latest operation of the setting switch 17, for instance, which is the case when the ASC has been interrupted by application of the brake immediately after operation of the main switch 16, the acceleration timer Tac is reset to 0 in step S14. Since the brake release condition has been interrupted, a brake release flag BF is reset in step S15, and the target vehicle speed Vo is updated on the basis of the actual vehicle speed Vn in step S16. The latest target vehicle speed at the time the setting switch 17 is opened is adopted as the target vehicle speed Vo.

When the target vehicle speed Vo is set in the aforesaid manner and when that the ASC is now proceeding is determined through a judgement as to whether the starting flag SF is in the 1 position in step S17, the controller 8 then decides whether the brake pedal has been operated (step S18). When the answer is YES, the controller 8 shifts to the normal throttle control mode after setting the brake release flag BF to 1 (step S19). When the answer to the question of step S18 is NO, the controller determines whether the accelerator pedal 10 has been depressed (step S20), and if the answer is NO, the controller proceeds to step S21 where it makes a judgement as to whether the setting switch 17 has been closed. If it is found in step S20 that the accelerator pedal has been depressed and at the same time it is judged that the brake release flag BF is in 1 position (step S30), the controller 8 shifts to the normal throttle control mode. When it is judged in the step S30 that the brake release flag BF is not in the 1 position, the controller 8 sets an acceleration flag AF to 1, and shifts to an accelerator acceleration control mode after substituting a throttle-opening-during-cruising Tcon (to be described later) for a target throttle opening Tv (which will become apparent later) in order to prepare the ASC for restarting.

When it is judged in step S21 that the setting switch 17 has been closed, the controller 8 performs setting control which will be described later with reference to FIG. 6. When it is judged in step S21 that the setting switch 17 is open, the controller 8 sets the setting switch flag SSWF to 0 in step S22. Thereafter, it is judged in step S23 whether the coast switch 19 has been closed. When the answer is YES, the target throttle opening To is set to 0 in step S33, and the throttle valve 2 is held in the full closed position so long as the coast switch 19 is closed. Then, in step S34 a coast switch flag CSWF is set to 1. On the other hand, when it is judged in the step S23 that the coast switch 19 is open, the controller 8 judges in step S24 whether the coast switch flag CSWF is in the 1 position. When the answer is NO, the controller 8 directly proceeds to step S27, while when the answer is YES, the controller 8 proceeds to step S27 by way of steps S25 and S26. In step S25, the actual vehicle speed Vn is adopted as the target vehicle speed Vo, and in step S26, the coast switch flag CSWF is reset to 0. In the step S27, the controller 8 judges whether the resume switch 18 has been closed, and when the answer is YES, the controller 8 shifts to a resume control mode after setting the resume flag RF to 1 in step S35. On the other hand, when it is judged in the step S27 that the resume switch 18 is open, the controller 8 shifts to a vehicle speed feedback control (constant-speed cruising control) mode provided that neither the resume flag nor the brake release flag BF is in the 1 position (steps S28 and S29).

In the vehicle speed feedback control mode, a throttle opening Tv, required for obtaining a target vehicle speed Vo, is calculated on the basis of the difference between the target vehicle speed Vo and the actual vehicle speed Vn, and the vehicle speed is feedback-controlled, with the throttle opening thus calculated being used as a target throttle opening To. When the brake is operated during the vehicle speed feedback control, the answer in step S18 becomes YES, and accordingly the controller 8 interrupts the vehicle speed feedback control and shifts to the normal throttle control mode after setting the brake release flag BF to 1 in step S19.

In the normal throttle control mode, the amount of depression α of the accelerator pedal 10 is detected, and a basic throttle opening Tb for the detected amount of depression α is calculated taking into account the gear speed and the selected gear-shifting mode (i.e., economy, normal or power). Then the target throttle opening To is set by correcting the basic throttle opening Tb according to the speed with which the accelerator pedal is depressed, the vehicle speed, the engine coolant temperature, and the like.

Figure 8:
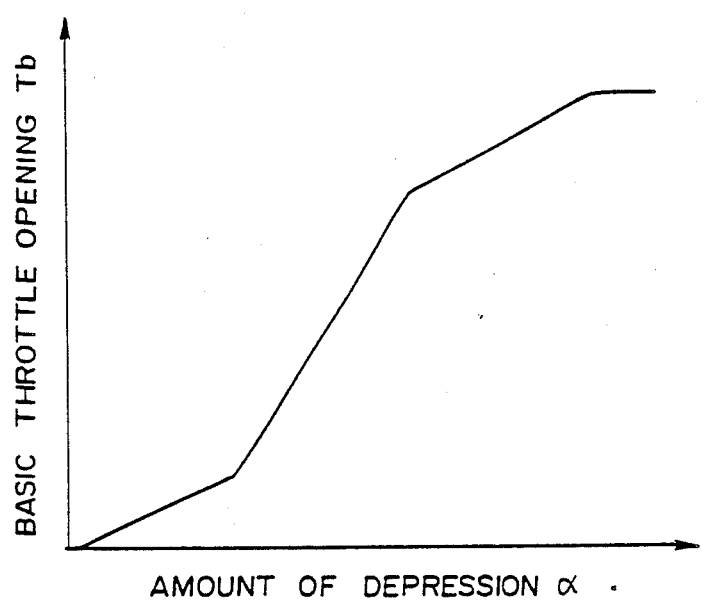
FIG. 8 is a view showing an example of the relation between the basic throttle opening and the amount of depression of the accelerator pedal.

In the accelerator acceleration control, the target throttle opening To is set on the basis of the sum of the target throttle opening Tv corresponding to the target vehicle speed Vo in the vehicle speed feedback control, which was performed by the controller 8 immediately before the controller 8 starts the accelerator acceleration control, and the basic throttle opening Tb corresponding to the amount of depression α of the accelerator pedal 10 at that time. FIG. 8 shows an example of the relation between the basic throttle opening Tb and the amount of depression of the accelerator pedal 10.

FIG. 4 shows a subroutine for the transmission control carried out in step S9 of the main routine. In step S40 the controller 8 decides whether the ASC is now on. When the answer is NO, the controller 8 performs normal transmission control. In normal transmission control, the gear-shifting is controlled in accordance with a pattern in which the gear stage is related to the vehicle speed and the amount of depression α of the accelerator pedal 10. On the other hand, when the answer is YES, in steps S41 to S46 the controller 8 decides whether the accelerator pedal 10 has been depressed, whether the setting switch flag SSWF is in the 1 position, whether the coast switch flag SWF is in the 1 position, whether the resume flag RF is in the 1 position, whether the brake has been released, and whether the acceleration flag AF is in the 1 position. When the answers in the steps S41 to S46 are all NO, the controller 8 performs vehicle speed feedback transmission control.

When it is judged in step S41 that the accelerator pedal 10 has been depressed, the controller performs normal transmission control. When it is judged in step S42 that the setting switch flag SSWF is in the 1 position, the controller 8 shifts the transmission down from fourth gear to third gear in step S47, and sets a switch flag WF to 1 in step S48. When it is judged in step S43 that the coast switch flag CSWF is in the 1 position, the controller 8 shifts the transmission down from fourth gear to third gear in step S49 and sets the switch flag WF to 3 in step S50. When it is judged in step S44 that the resume flag RF is in the 1 position, the controller 8 shifts the transmission down from fourth gear to third gear in step S51 and sets the switch flag WF to 2 in step S52. Further, when it is judged in step S45 that the brake has been released, the controller performs normal transmission control. When it is judged in step S46 that the acceleration flag AF is in the 1 position, and at the same time it is judged in step S53 that the difference between the target vehicle speed Vo and the actual vehicle speed Vn is not larger than a predetermined value, e.g., 2 Km/h, the controller 8 performs vehicle speed F/B transmission control after resetting the acceleration flag AF to 0 in step S54.

Figure 5B:
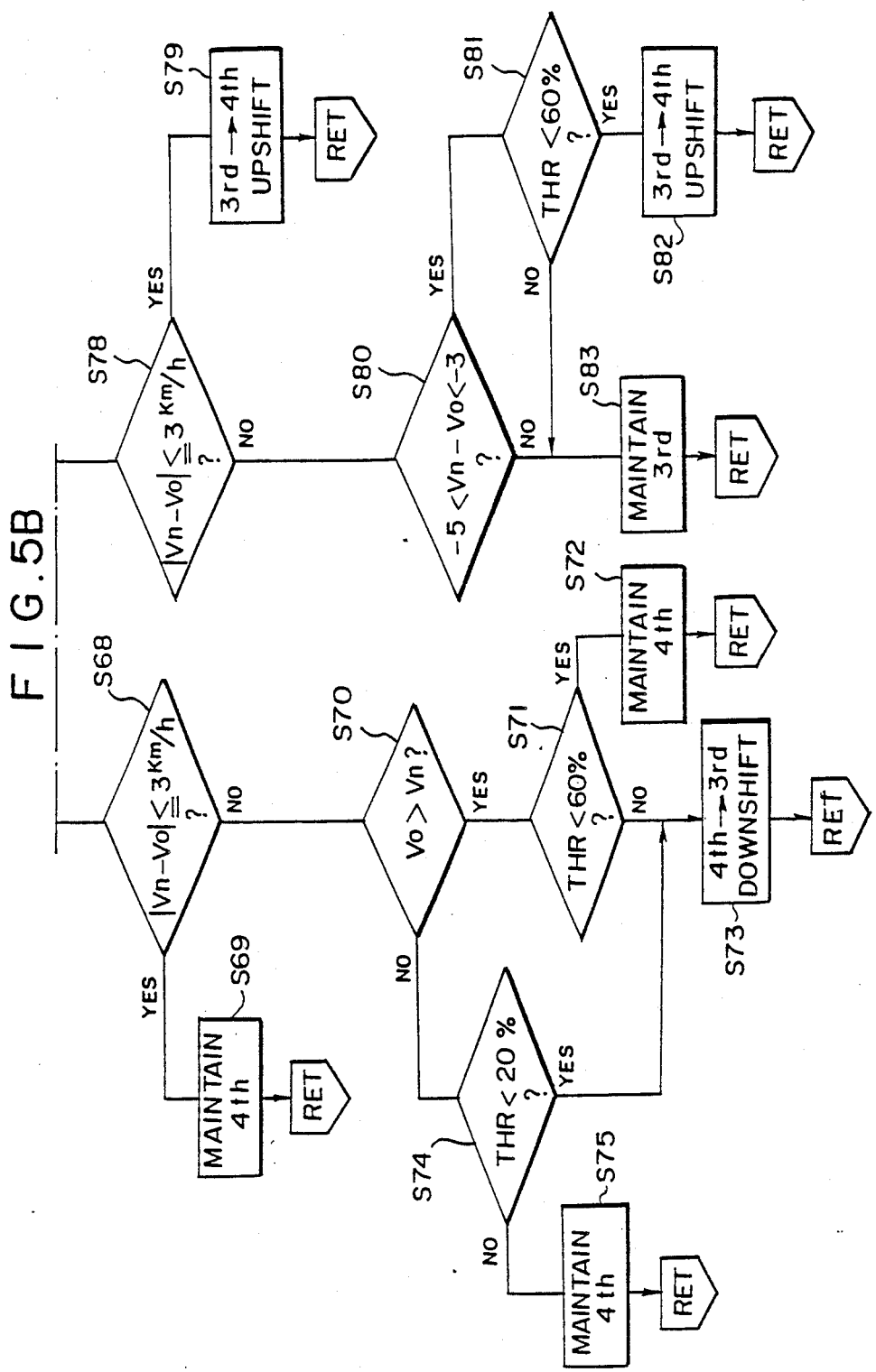

FIG. 5 shows a subroutine for vehicle speed feedback transmission control. First the controller 8 determines in step S60 whether the switch flag WF has been reset. The switch flag WF is set in steps S48, S50 or S52 shown in FIG. 4. When the switch flag WF has not been reset, the controller 8 proceeds to step S61 and determines whether the vehicle speed feedback transmission control has been just started. When the answer is YES, the switch flag WF is reset in step S62 and the transmission, which has been shifted down to third gear in step S47, S49 or S51, is shifted up to fourth gear in step S63.

When it is judged in step S60 that the switch flag WF has been reset, an average throttle opening THR is calculated in step S64. The average throttle opening THR is the average of a predetermined number of preceding detected throttle openings THn. In the vehicle speed feedback transmission control the average throttle opening THR is used in order to prevent hunting of the transmission, when the throttle opening per se is hunting. Thereafter, the controller 8 determines in step S65 whether the transmission is in third gear on the basis of the gear position signal GP. When the answer is NO, the controller 8 proceeds to step S66 and determines whether there is a sufficient torque margin by judging whether the throttle opening THR has exceeded 80%. When the throttle opening THR has exceeded 80% and the torque margin is insufficient, the controller 8 shifts the transmission down to third gear in step S67. Otherwise, the controller 8 determines in step S68 whether the difference between the target vehicle speed Vo and the actual vehicle speed Vn is within plus or minus 3 Km/h, that is, whether the actual vehicle speed Vn is converging on the target vehicle speed Vo. When it is judged that the actual vehicle speed Vn is converging on the target vehicle speed Vo, in step S69 the controller 8 holds the transmission in fourth gear. Otherwise, the controller 8 determines in step S70 whether the actual vehicle speed Vn is lower than the target vehicle speed Vo. When the former is lower than the latter, which is the case, for instance, when the vehicle is ascending a slope, the controller 8 determines in step S71 whether there is a sufficient torque margin by judging whether the throttle opening THR is less than 60%. When the throttle opening is less than 60%, that is, when there is a sufficient torque margin, the controller 8 holds the transmission in fourth gear, considering that the transmission need not be shifted down to accelerate the vehicle (step S72). On the other hand, when the throttle opening is more than 60%, the controller 8 considers the torque margin insufficient to accelerate the vehicle and shifts the transmission down to third gear (step S73).

On the other hand, when it is judged in step S70 that the actual vehicle speed Vn is not lower than the target vehicle speed Vo, which is the case, for instance, when the vehicle is descending a slope, the controller 8 proceeds to step S74 and determines whether the throttle opening THR is less than 20%, thereby judging whether the engine brake effect is sufficient. When it is judged that the throttle opening THR is more than 20% and the engine brake effect can be further enhanced to a sufficient extent, the controller 8 holds the transmission in fourth gear, considering that the transmission need not be shifted down to decelerate the vehicle (step S75). On the other hand, when the throttle opening THR is less than 20% and it is considered that the engine brake effect is not sufficient to decelerate the vehicle, the controller 8 shifts the transmission down to third gear (step S73).

When it is judged in step S65 that the transmission is in third gear, the controller 8 proceeds to step S76 and determines whether there is a sufficient torque margin by judging whether the throttle opening THR has exceeded 80%. When the throttle opening THR has exceeded 80% and the torque margin is insufficient, the controller 8 holds the transmission in third gear (step S77). Otherwise, the controller 8 determines in step S78 whether the difference between the target vehicle speed Vo and the actual vehicle speed Vn is within plus or minus 3 Km/h, that is, whether the actual vehicle speed Vn is converging on the target vehicle speed Vo. When it is judged that the actual vehicle speed Vn is converging on the target vehicle speed Vo, the controller 8 shifts the transmission up to fourth gear in step S79. Otherwise, the controller 8 determines in step S80 whether the actual vehicle speed Vn is 3 to 5 Km/h lower than the target vehicle speed Vo. When the former is lower than the latter and the difference therebetween is 3 to 5 Km/h, which is the case, for instance, when the vehicle is ascending a slope, the controller 8 determines in step S81 whether there is a sufficient torque margin by judging whether the throttle opening THR is less than 60%. When the throttle opening is less than 60%, that is, when there is a sufficient torque margin, the controller 8 shifts the transmission up to fourth gear, considering that fourth gear will suffice for accelerating the vehicle (step S82). On the other hand, when the throttle opening is more than 60%, the controller 8 considers the torque margin insufficient to accelerate the vehicle and holds the transmission in third gear (step S83).

The particular values of the throttle opening for judging the torque margin, i.e., 80%, 60%, 20%, may be suitably determined depending on the output characteristics of the engine or the like.

Figure 6B:
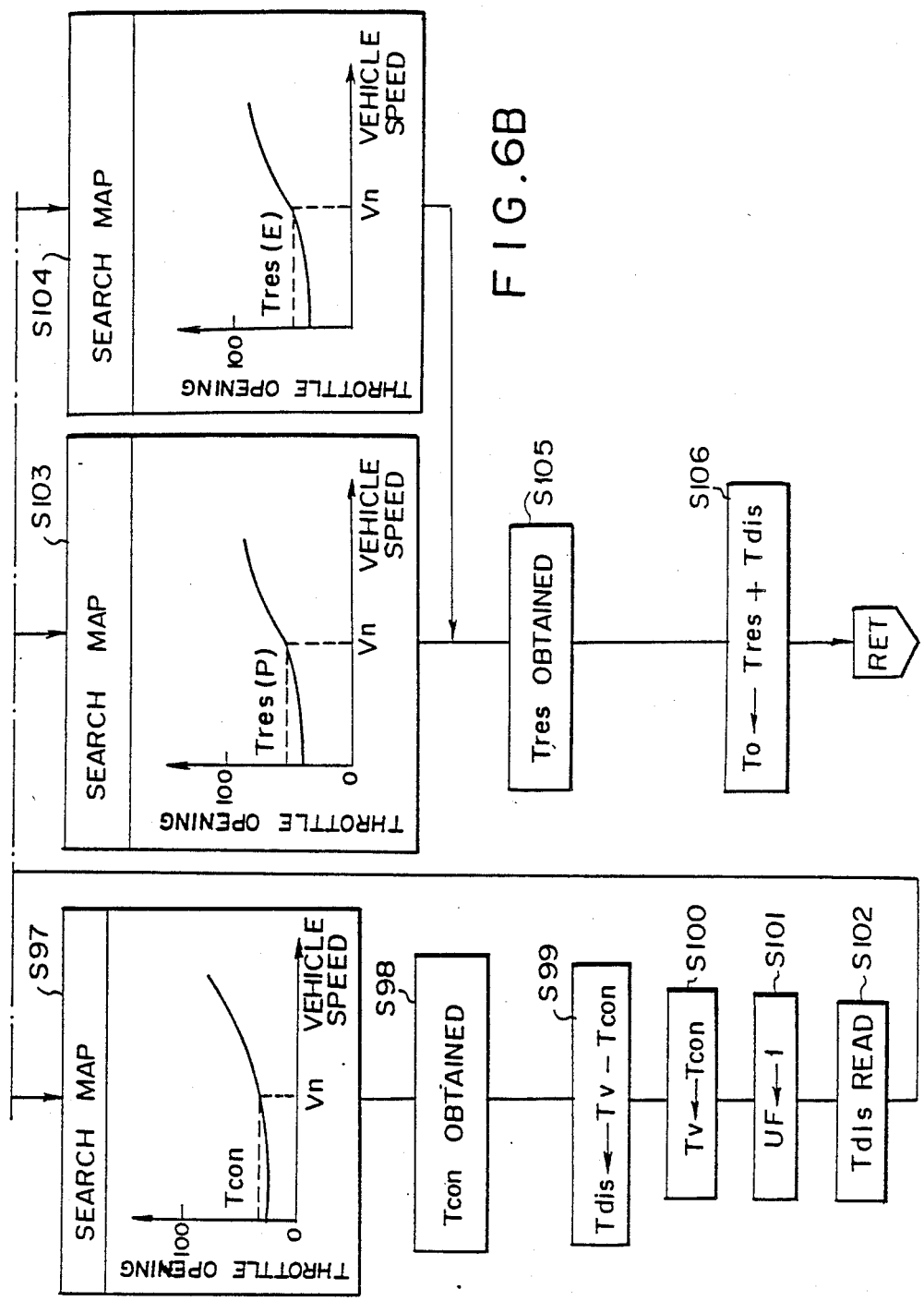

FIG. 6 shows a subroutine for the setting control carried out in the subroutine shown in FIG. 3. When the setting switch 17 is operated during the vehicle speed feedback control, the controller 8 determines whether the count of the acceleration timer Tac has exceeded a preset value Tset (delay time) (step S90). When the answer is NO, the controller 8 shifts to the vehicle speed feedback control mode after resetting the setting switch flag SSWF in step S91. When it is judged that the count of the acceleration timer Tac has exceeded the preset value Tset, the controller 8 sets the setting switch flag SSWF to 1 in step S92, and reads the actual vehicle speed Vn in step S93. Then the controller 8 determines in step S94 whether a correction flag UF is in the 1 position, and when the answer is YES, the controller 8 directly proceeds to step S95, while when the answer is NO, the controller 8 proceeds to step S95 by way of steps S96 to S102. In step S96, the controller 8 reads the present target throttle opening Tv. Then the controller 8 obtains, on the basis of the actual vehicle speed Vn, a throttle opening Tcon for even road cruising from a map in which the throttle opening Tcon is related to the actual vehicle speed Vn (steps S97 and S98). Then a load compensating throttle opening Tdis is obtained on the basis of the difference between the present target throttle opening Tv and the even road cruising throttle opening Tcon for the actual vehicle speed Vn. In the next step S100, the controller 8 substitutes the even road cruising throttle opening Tcon for the present target throttle opening Tv. Further, the controller 8 sets the correction flag UF to 1 in step S101, and reads the load compensating throttle opening Tdis in step 102. Then the controller 8 proceeds to step S95.

In the step S95, the controller 8 determines whether the selected gear-shifting mode is the power mode. When the answer is YES, the controller 8 obtains, on the basis of the actual vehicle speed Vn, a throttle opening Tres for accelerating the vehicle speed at a constant acceleration on an even road from a power mode constant acceleration map, in which the throttle opening Tres for the power mode is related to the actual vehicle speed Vn. When the answer is NO, the controller 8 obtains Tres from an economy mode constant acceleration map in which the throttle opening Tres for the economy mode is related to the actual vehicle speed Vn (steps S103-S105 or steps S104-S105). Then the controller 8 sets the target throttle opening To to the sum of Tres and Tdis in step S106.

Figure 9:
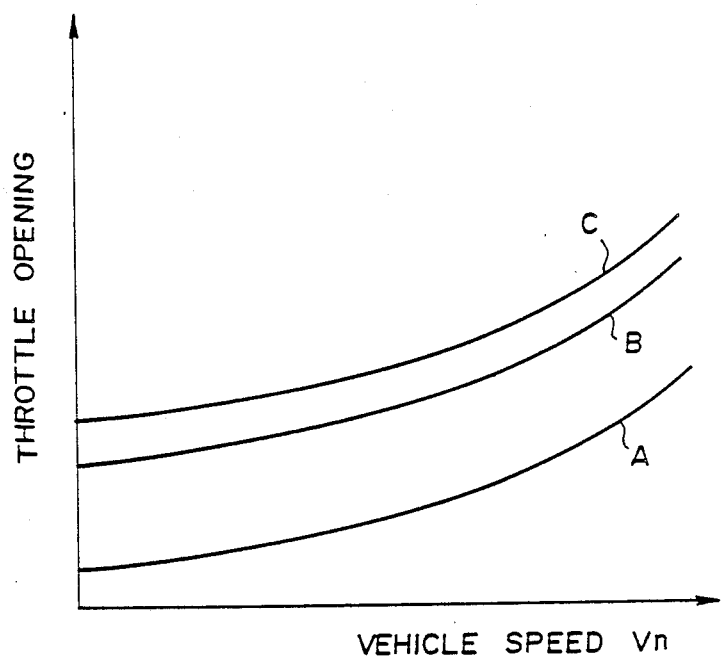
FIG. 9 is a view showing a few examples of the relation between the vehicle speed and the throttle opening required for accelerating the vehicle at a predetermined constant acceleration during cruising on an even road.

In FIG. 9, curve A shows an example of the relation between the vehicle speed and the throttle opening required for the vehicle to cruise at a given constant speed on an even road. Curve B shows an example of the relation between the vehicle speed and the throttle opening required for accelerating the vehicle at a first predetermined constant acceleration during cruising on an even road, and curve C shows an example of the relation between the vehicle speed and the throttle opening required for accelerating the vehicle at a second predetermined constant acceleration during cruising on an even road. The second predetermined constant acceleration is higher than the first predetermined constant acceleration, that is, the curve C is for the power mode and the curve B is for the economy mode. These curves A, B and C are empirically obtained.

Figure 7:
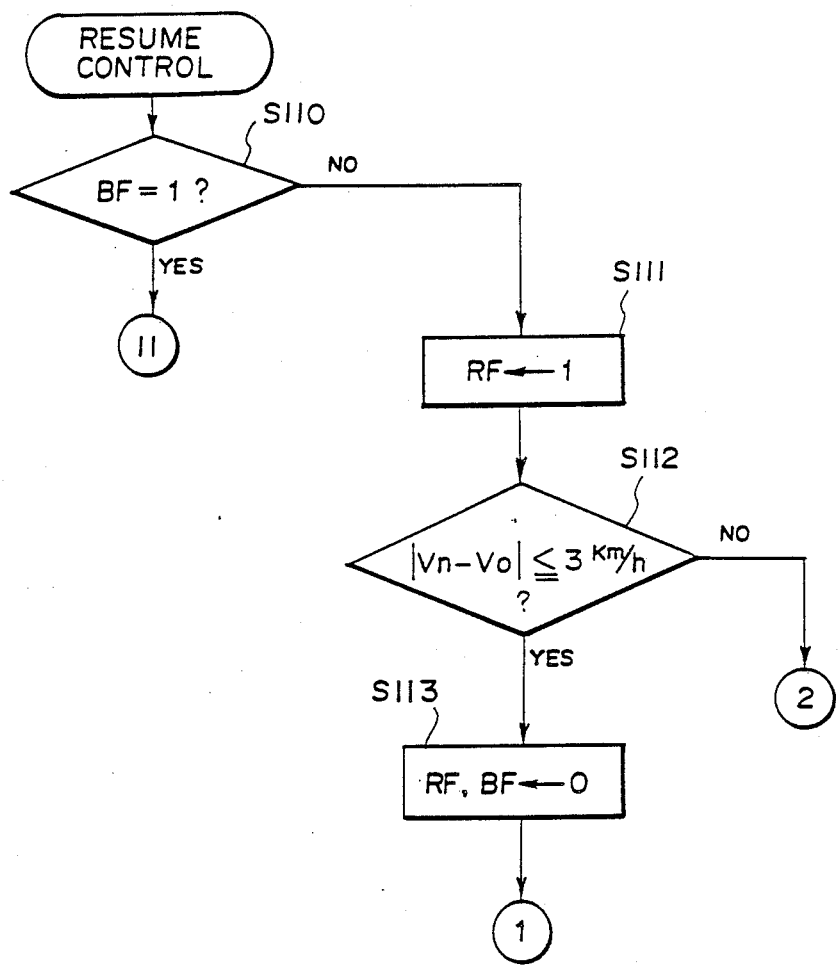

FIG. 7 shows a subroutine for the resume control carried out in the subroutine shown in FIG. 3. When the resume switch 18 is closed to return the target vehicle speed Vo to the original set value when the ASC has been interrupted by operation of the brake during the vehicle speed feedback control, the controller 8 performs the resume control. The controller 8 first makes a judgement as to whether the brake release flag BF is in the 1 position (step S110), and when the answer is YES, the controller 8 shifts to the normal throttle control (FIG. 3). On the other hand, when the answer is NO, the controller 8 sets the resume flag RF to 1 in step S111, and determines in step S112 whether the difference between the target vehicle speed Vo and the actual vehicle speed Vn is within plus or minus 3 Km/h, that is, whether the actual vehicle speed Vn is converging on the target vehicle speed Vo. When it is judged that the actual vehicle speed Vn is converging on the target vehicle speed, the controller 8 resets the resume flag RF and the brake release flag BF to 0 in step S113 and shifts to the vehicle speed feedback control. Otherwise, the controller 8 proceeds to step S93 in the setting control shown in FIG. 6.

We claim:

1. A constant-speed cruising control system for a vehicle having an engine and an automatic transmission having a plurality of gear stages, comprising
- a vehicle speed control means which controls an engine output control means on the basis of the difference between a target vehicle speed and the actual vehicle speed so that the latter approaches the former,
- an electromagnetic gear shifting means which receives a gear shifting command and shifts the gear stage of the automatic transmission according to the content of the gear shifting command which it receives, and
- a first gear-shifting control means which receives an engine load signal representing the load on the engine and a speed difference signal representing the difference between said target vehicle speed and the actual vehicle speed, and delivers to the electromagnetic gear shifting means during operation of the vehicle speed control means a gear shifting command which requires the gear shifting means to shift the gear stage down either when the load on the engine is not lighter than a first preset value or when the load on the engine is lighter than the first preset value and heavier than a second preset value and at the same time the difference between the target vehicle speed and the actual vehicle speed is larger than a preset speed.

2. A constant-speed cruising control system as defined in claim 1 in which said engine output control means comprises a throttle valve for controlling the amount of intake air, said engine load signal represents the opening of the throttle valve, and said first and second preset values represent the opening of the throttle valve.

3. A constant-speed cruising control system as defined in claim 2 further comprising a second gear-shifting control means which delivers to the electromagnetic gear shifting means the gear shifting command in place of said first gear shifting control means in a predetermined case, the gear shifting command being generated in accordance with a gear stage determined on the basis of the relation between the engine load and the vehicle speed.

4. A constant-speed cruising control system as defined in claim 3 in which, when the accelerator pedal is depressed by an amount larger than a predetermined value, the throttle valve is opened by an amount corresponding to the amount of depression of the accelerator pedal, and said second gear-shifting control means generates the gear shifting command in place of said first gear-shifting control means.

5. A constant-speed cruising control system as defined in claim 4 in which, when the amount of depression of the accelerator pedal becomes smaller than the predetermined value and the difference between the actual vehicle speed and the target vehicle speed becomes smaller than a predetermined value, the first gear-shifting control means generates the gear shifting command in place of the second gear-shifting control means to restart the constant-speed cruising control.

6. A constant-speed cruising control system as defined in claim 4 in which, when the accelerator pedal is depressed by an amount larger than a predetermined value, said engine output control means controls the opening of the throttle valve by adopting as the target throttle opening the sum of the basic throttle opening corresponding to the amount of depression of the accelerator pedal and the target throttle opening corresponding to the target vehicle speed before the accelerator pedal is depressed.

7. A constant-speed cruising control system as defined in claim 1 in which, when the engine load represented by the engine load signal is between the first and second preset values and at the same time the actual vehicle speed is lower than the target vehicle speed with the difference therebetween represented by the speed difference signal being larger than said preset speed and being in a predetermined range, said first gear-shifting control means delivers to the electromagnetic gear shifting means a gear shifting command which requires the gear shifting means to shift up the gear stage of the automatic transmission.

8. A constant-speed cruising control system as defined in claim 1 in which, when the engine load represented by the engine load signal is lighter than a third preset value which is smaller than the second preset value and at the same time the actual vehicle speed is higher than the target vehicle speed, said first gear-shifting control means delivers to the electromagnetic gear shifting means a gear shifting command which requires the gear shifting means to shift down the gear stage of the automatic transmission.

9. A constant-speed cruising control system for a vehicle having an engine provided with a throttle valve for controlling the amount of intake air and an automatic transmission having a plurality of gear stages, comprising
- vehicle speed control means which controls the opening of the throttle valve on the basis of the difference between a target vehicle speed and the actual vehicle speed so that the latter approaches the former,
- an electromagnetic gear shifting means which receives a gear shifting command and shifts the gear stage of the automatic transmission according to the content of the gear shifting command which it receives, and
- a first gear-shifting control means which receives a throttle opening signal representing the opening of the throttle valve and a speed difference signal representing the difference between said target vehicle speed and the actual vehicle speed, and delivers to the electromagnetic gear shifting means during operation of the vehicle speed control means a gear shifting command which requires the gear shifting means to shift down the gear stage either when the opening of the throttle valve is not smaller than a first preset value or when the opening of the throttle valve is smaller than the first preset value and larger than a second preset value and at the same time the difference between the target vehicle speed and the actual vehicle speed is larger than a preset speed, or when the opening of the throttle valve is smaller than a third preset value, which third preset value is smaller than the second preset value, and the actual vehicle speed is not lower than the target vehicle speed.

10. A constant-speed cruising control system as defined in claim 9 in which, when the opening of the throttle valve is between the first and second preset values and at the same time the actual vehicle speed is lower than the target vehicle speed with the difference therebetween represented by the speed difference signal being larger than said preset speed and being in a predetermined range, said first gear-shifting control means delivers to the electromagnetic gear shifting means a gear shifting command which requires the gear shifting means to shift up the gear stage of the automatic transmission.

11. A constant-speed cruising control method for a vehicle having an engine and an automatic transmission having a plurality of gear stages, comprising the steps of
controlling an engine output control means on the basis of the difference between a target vehicle speed and the actual vehicle speed so that the latter approaches the former, and
controlling the automatic transmission to downshift either when the load on the engine is not lighter than a first preset value or when the load on the engine is lighter than the first preset value and heavier than a second preset value and at the same time the difference between the target vehicle speed and the actual vehicle speed is larger than a preset speed.

12. A constant-speed cruising control method as defined in claim 11, in which the automatic transmission is caused to upshift when the engine load is between the first and second preset values and at the same time the actual vehicle speed is lower than the target vehicle speed with the difference therebetween being larger than said preset speed and being in a predetermined range.

13. A constant-speed cruising control method as defined in claim 11 in which the automatic transmission is caused to downshift when the engine load is lighter than a third preset value which is lighter than the second preset value and at the same time the actual vehicle speed is higher than the target vehicle speed.

14. A constant-speed cruising control method for a vehicle having an engine provided with a throttle valve for controlling the amount of intake air and an automatic transmission having a plurality of gear stages, comprising the steps of
controlling the opening of the throttle valve on the basis of the difference between a target vehicle speed and the actual vehicle speed so that the latter approaches the former, and
controlling the automatic transmission to downshift when the opening of the throttle valve is not smaller than a first preset value, or when the opening of the throttle valve is smaller than the first preset value and larger than a second preset value and at the same time the difference between the target vehicle speed and the actual vehicle speed is larger than a preset speed, or when the opening of the throttle valve is smaller than a third preset value smaller than the second preset value and the actual vehicle speed is not lower than the target vehicle speed.

* * * * *